June 29, 1926.
T. ROTHERAM
1,590,855
APPARATUS FOR FORMING OPTICAL BLANKS
Filed Feb. 9, 1923    6 Sheets-Sheet 5
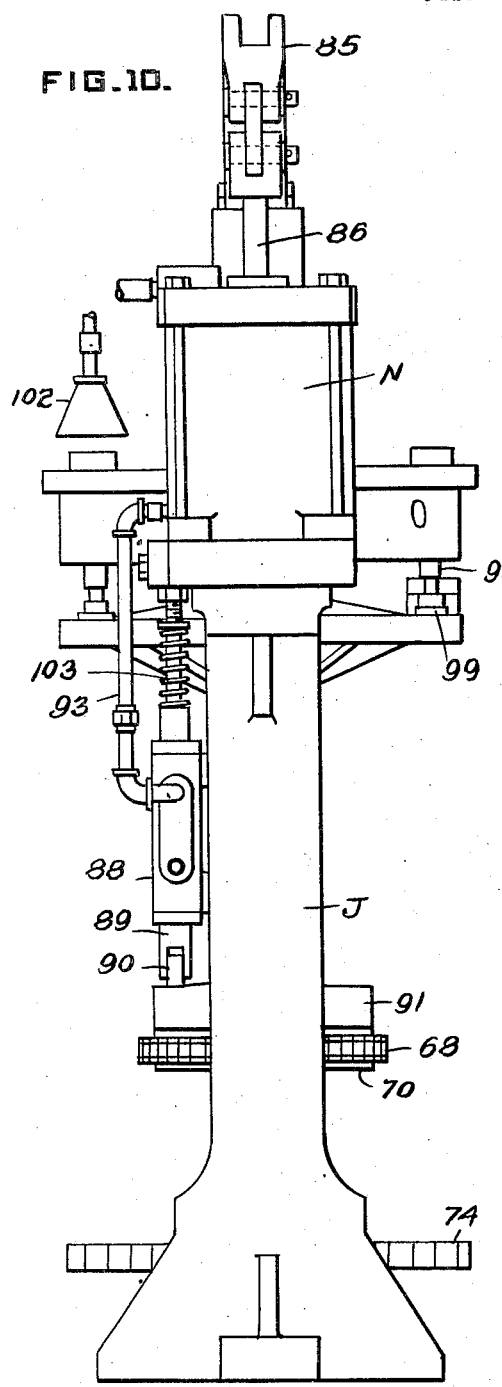
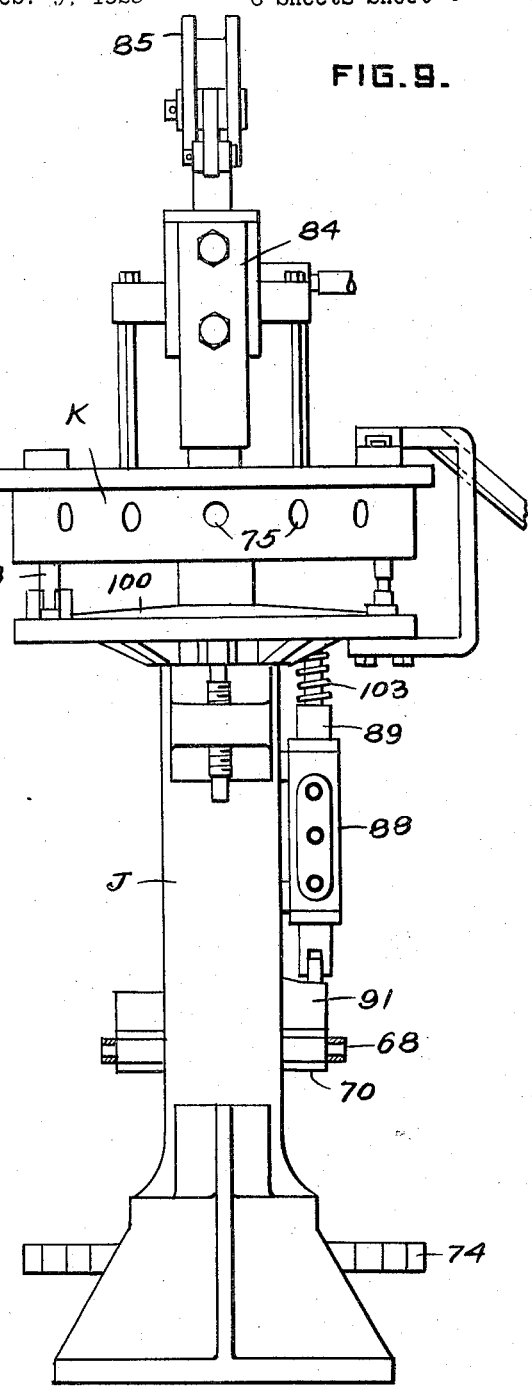
INVENTOR
Thomas Rotheram

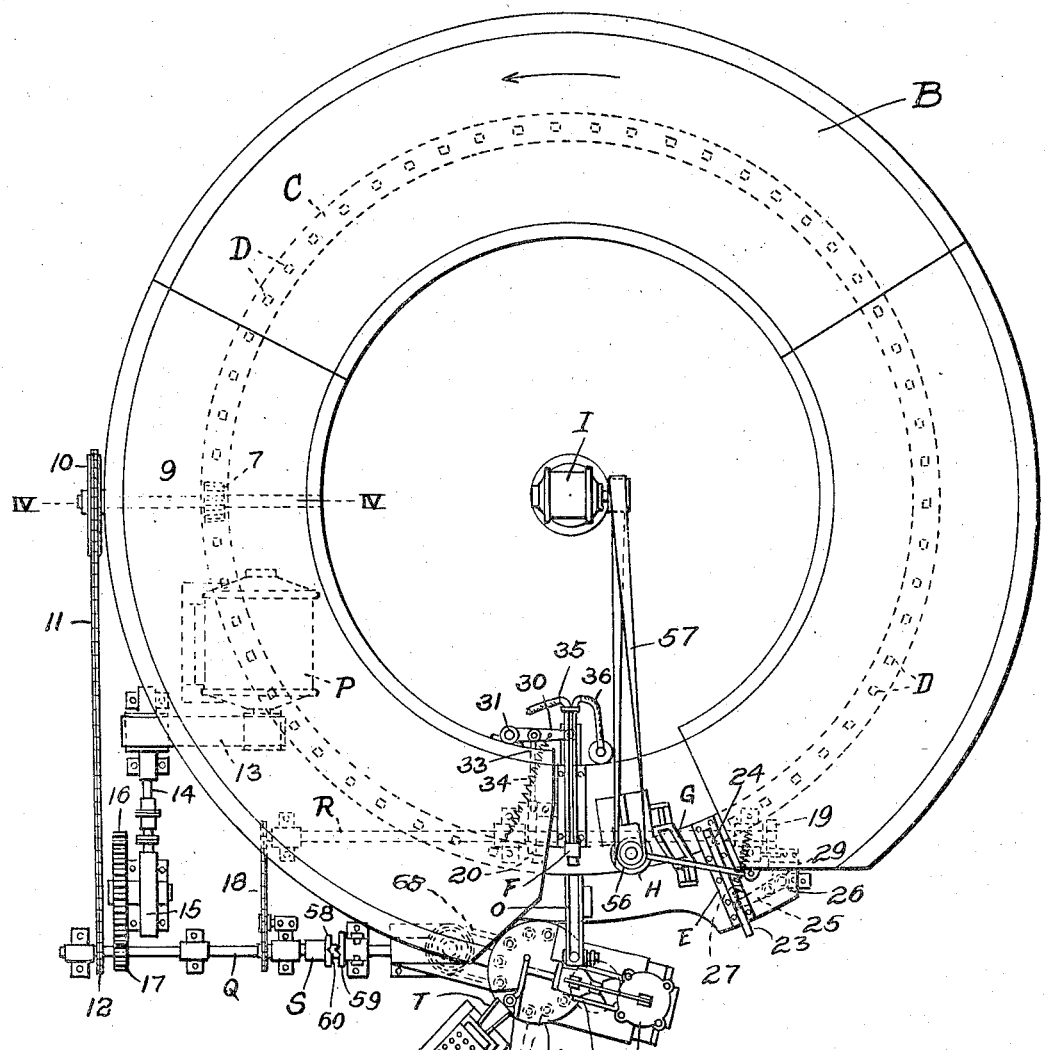

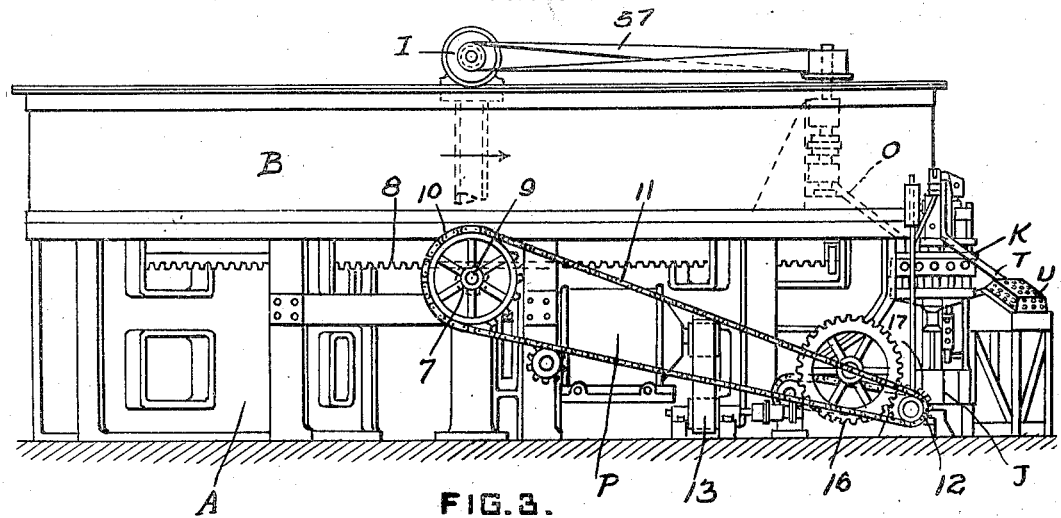
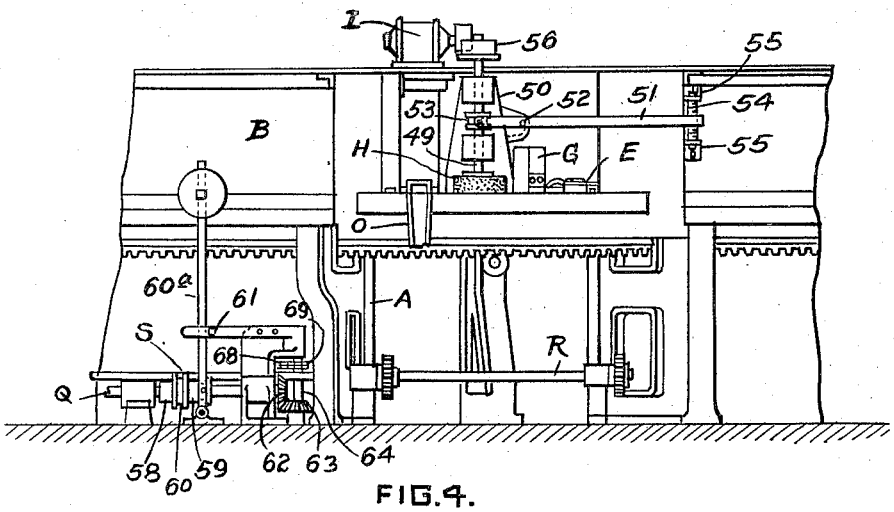
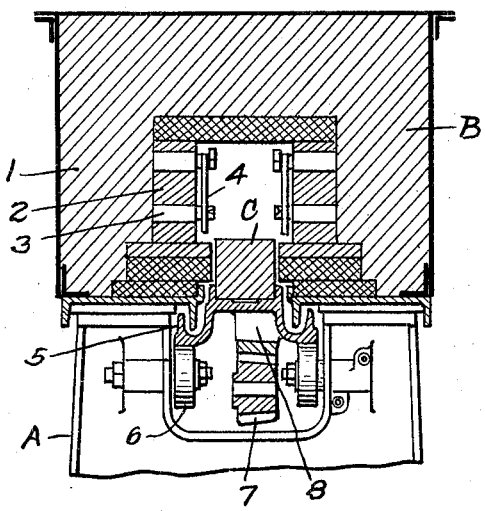

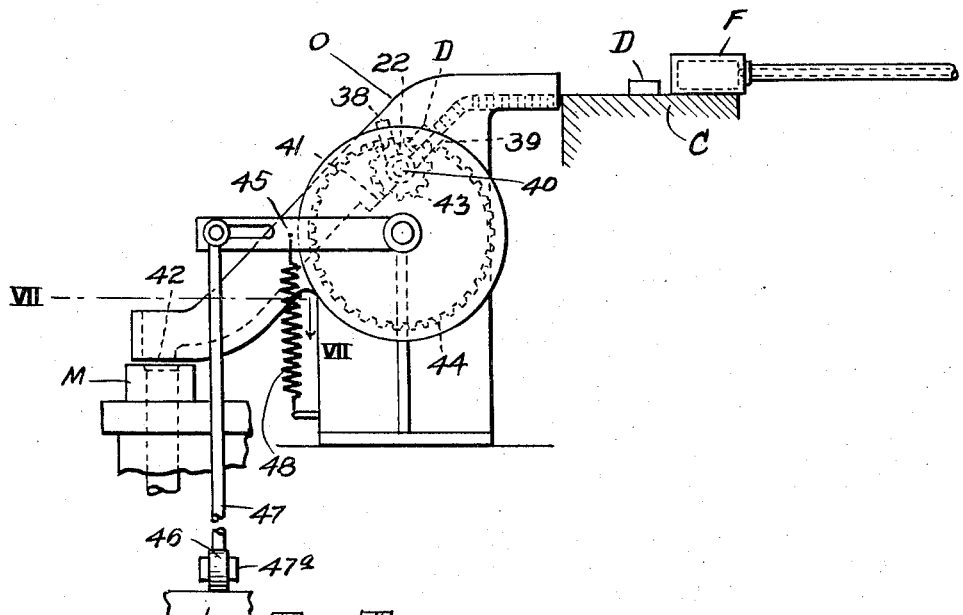
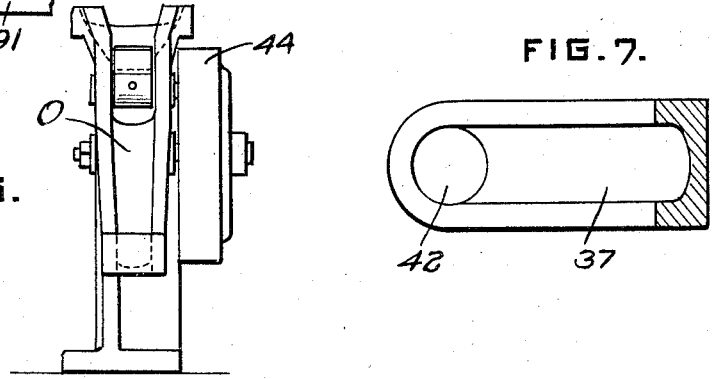

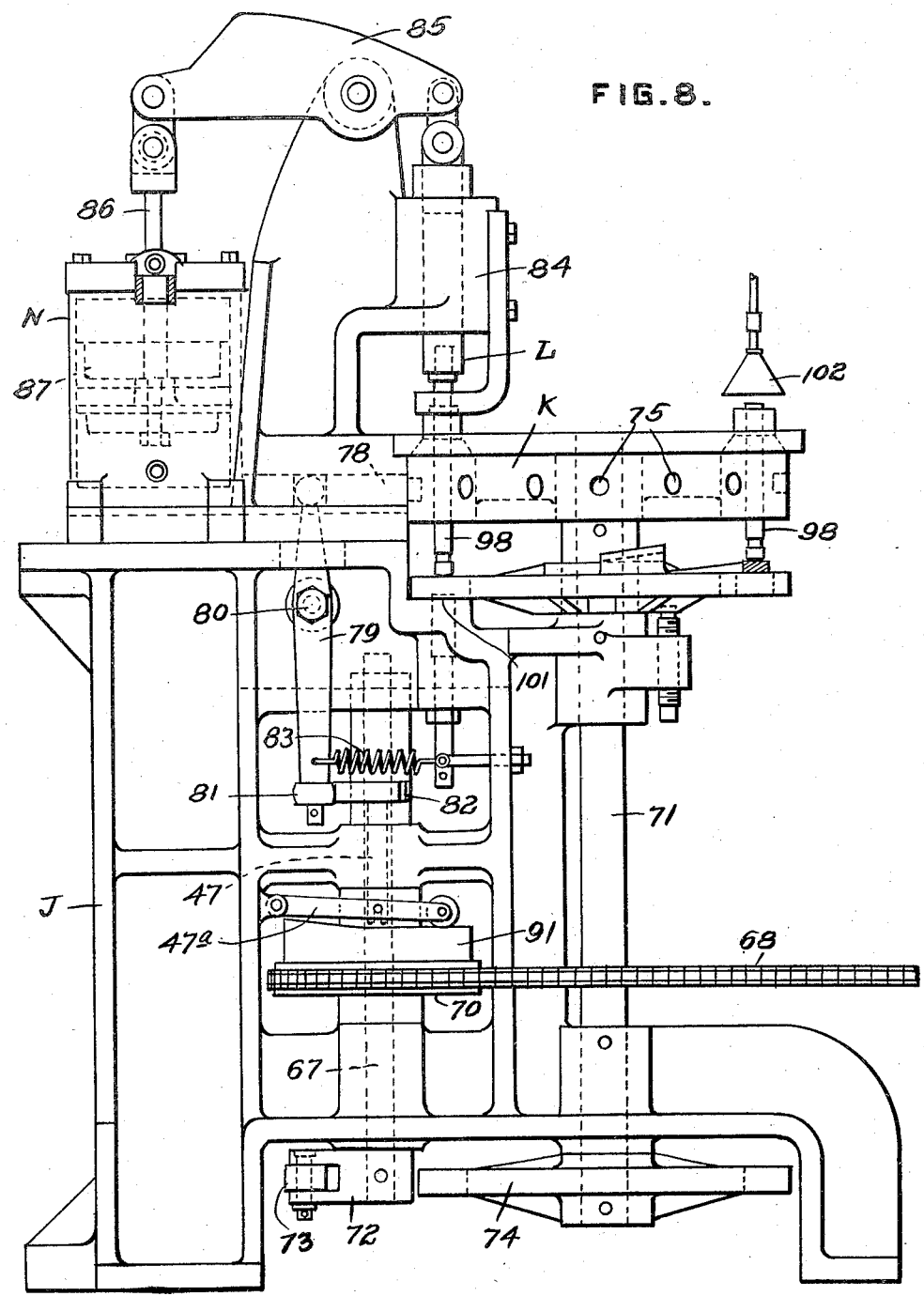

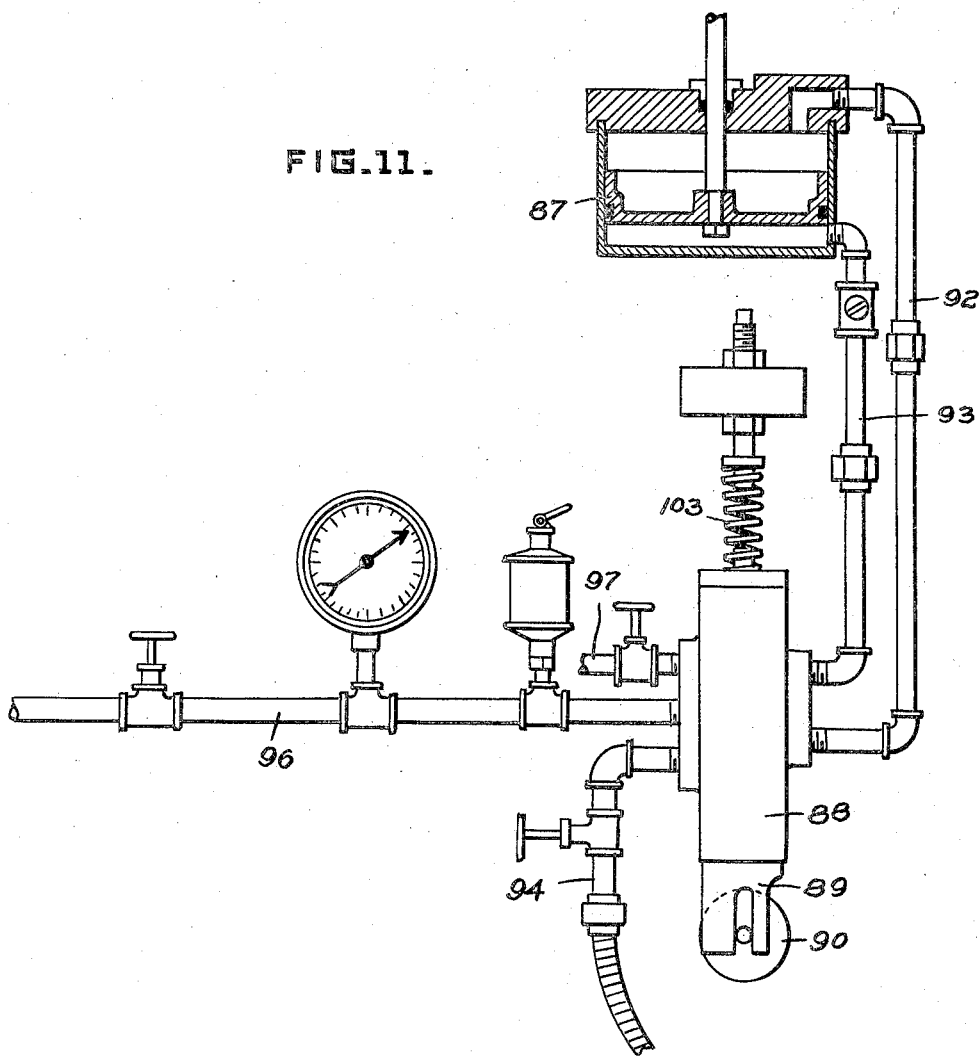

Patented June 29, 1926.                                                             1,590,855

UNITED STATES PATENT OFFICE.

THOMAS ROTHERAM, OF CREIGHTON, PENNSYLVANIA, ASSIGNOR TO PITTSBURGH PLATE GLASS COMPANY, A CORPORATION OF PENNSYLVANIA.

APPARATUS FOR FORMING OPTICAL BLANKS.

Application filed February 9, 1923. Serial No. 618,087.

The invention relates to an apparatus for forming optical blanks of all kinds, such as those used for spectacles and lenses of various kinds. It has among its principal objects, the provision of an improved construction, (1) which may be made substantially automatic throughout, (2) in which the blanks are delivered directly from the heating furnace to the press rapidly and without the necessity of reheating them, and (3) in which provision is made for turning the blanks over between the furnace and press so that any marring due to contact with the furnace carrier and to the action of the press plunger shall be upon the same side of the blanks. The preferred embodiment of the invention is illustrated in the accompanying drawings wherein:

Figure 1 is a plan view of the assembled apparatus; Fig. 1ª is a perspective detail view showing the means for operating the blank feed device; Fig. 2 is a side elevation; Fig. 3 is a partial front elevation; Fig. 4 is a transverse section on the line IV—IV of Fig. 1; Figs. 5, 6 and 7 are details of the transfer and turnover device between the furnace and the press; Fig. 5 being a side elevation, Fig. 6 being a front view, and Fig. 7 being a section on the line VII—VII of Fig. 5; Fig. 8 is a rear elevation of the pressing or molding machine; Figs. 9 and 10 are elevations looking at the opposite sides of the press and Fig. 11 is a diagrammatic view showing the connection and arrangement of the air operating system.

In carrying out the invention in its preferred form, an annular heating chamber for the blanks is employed for bringing the blanks to a plastic condition for molding or pressing in connection with a press located alongside the furnace at the discharge side thereof and a transfer device whereby the blanks are moved in plastic condition from the furnace to the press. The furnace is provided with an endless carrier (preferably annular) to which the blanks are fed, and heating means are provided, so that these blanks, as they progress from the entrance to the exit portion of the furnace, are gradually raised to a temperature slightly in excess of that required for molding, but at the same time below the melting point of the glass, so that there is no substantial deformation of the blanks, and so that they may be readily transferred to the press without sticking. The blanks are heated to a temperature slightly in excess of that required for molding, so that in the transfer from the furnace to the press, no reheating means are required and any slight cooling of the blanks during the period of transfer will still leave them at a temperature suitable for pressing. The press is preferably located below the level of the furnace so that the transfer may be accomplished by gravity, the blanks being shoved off of the annular carrier and into the upper end of an inclined chute which carries them to a position for discharging into the press. A turnover device is also preferably employed in connection with this transfer mechanism in order to bring the lower faces of the blanks up during the pressing operation for a purpose to be more fully hereinafter set forth. In order to facilitate the positioning of the blanks in the molds of the press, which is of multiple type, such press is made of the intermittently rotating type with a single presser device, the table which carries the plurality of mold recesses being held stationary while the blank is being placed therein from the transfer mechanism and while the mold plunger is pressing the blank. The press plunger is preferably operated by air pressure and the exhaust from the air cylinder is utilized to discharge the blanks from the press after the glass is set and after the blank has been ejected from its mold cavity.

Referring to the general arrangement as shown in Figs. 1, 2 and 3, the principal parts may be enumerated as follows: A is the framework of the furnace which may be constructed of castings or suitable commercial sections; B is what may be termed a tunnel furnace which is of annular form, open at the bottom as indicated in Fig. 4; C is an annular carrier which moves between the side walls of the chamber B and constitutes the bottom closure of the chamber, such carrier serving to transport the blanks D as supplied by the feeder E (Fig. 1) around the circumference of the furnace where they are gradually brought to a plastic condition for molding and finally discharged at the exit end of the furnace by means of the member F; G is a container feeding over the carrier C and carrying a supply of dust which is deposited upon the carrier to prevent the blanks from sticking thereto; H is a grinder wheel lying above the carrier and driven from the motor I for smoothing up and leveling the upper face of the carrier from time to time; J is the framework of the press which carries the rotating table K of the press; L is the plunger by means of which the blanks are pressed into the mold cavities M of the table; N is the air cylinder from which the plunger L is operated; O is the transfer chute intermediate the furnace and the press by means of which the blanks are conveyed to the press after being heated to a molding temperature in the furnace; P is the main driving motor of the apparatus which serves to operate the press and turn the carrier C of the furnace; Q is the main drive shaft of the apparatus driven from the motor P through suitable reducing gearing; R is a cam shaft driven from the drive shaft Q by means of which the feed device E and discharge device F are operated; S is an automatic throw out clutch for disconnecting the press when the resistance to driving it arises above a certain point and tends to result in injury to the mechanism; T is a chute into which the blanks are discharged after they have been formed in the pressing machine and ejected from the molds and U is a pan at the lower end of the chute T into which the blanks are discharged from the chute and in which they are collected for subsequent removal to a suitable leer chamber.

The furnace B is made up of clay or brick walls 1 as indicated in Fig. 4, provided with inner walls 2 of insulating material in which are mounted insulator posts 3 adapted to form the support for wire coils 4 of suitable high resistance material. These coils are preferably arranged so as to give a gradually increasing temperature from the entrance to the exit ends of the furnace. The means for heating the furnace constitutes no part of the present invention, and if desired such heating might be accomplished by means other than electricity, although electricity is desirable for this purpose because of the ease with which it may be controlled. The annular carrier or hearth C is made up of fire clay or brick carried by the metal framework 5 in turn supported upon suitable rollers 6 carried by the framework A. Rotary movement is imparted to the carrier by means of a pinion 7 meshing with a rack 8 secured to or integral with the member 5, such member as well as the rack being made in sections of convenient length.

The pinion 7 is mounted upon a shaft 9 carrying at its outer end a sprocket wheel 10 driven by the chain 11 which passes around a sprocket 12 on the main drive shaft Q. The main drive shaft is driven from the motor P through the belt 13, the shaft 14, the worm reducing gearing in the casing 15 and the spur gears 16 and 17.

The cam shaft R is driven from the shaft Q by means of the chain 18 passing around suitable sprockets on the two shafts. The cam shaft is provided with two cams 19 and 20 which operate respectively the feed device E and the discharge device F. The feed member E comprises a rod 23 reciprocated in a slot 24 to which the blanks D are supplied at proper intervals by hand, or by means of suitable feed mechanism connected to a hopper or other container in which the blanks are deposited from time to time. The rod 23 is moved to the rear by the crank arm 25 and to the front by means of the spring 27. The arm 25 is keyed to the upper end of a vertical shaft 26 and this shaft is oscillated from the cam 19 on the shaft R, a roller 27ª engaging the cam and suitable connections therefrom to the shaft being employed including the lever 28, arm 29 and the crank arm 29ª keyed to the shaft 26.

The discharge member F is connected at its rear end to the horizontal lever 30 keyed to the upper end of the vertical shaft 31. This shaft 31 is oscillated by the connecting rod 33 from the cam 20, suitable operating means being employed intermediate the rod and cam including a roller engaging the cam and other connections similar to those shown in Fig. 1ª for oscillating the shaft 26. In this manner the rotation of the cam moves the discharge member F to the rear, while its reverse movement is secured by means of a spring 34. The discharge member is preferably hollow so that a cooling fluid may be circulated therethrough. This is accomplished by connecting the member with the inlet and outlet pipes numbered respectively 35 and 36. The movements of this discharge member F are similar to those of the feed member E, a blank being delivered to the carrier member or hearth C simultaneously with the discharge of one of the blanks therefrom.

As the blanks leave the hearth under the impulse of the discharge member F, they are received in an inclined chute O adapted to convey them to the pressing machine. Located in the line of movement of these blanks through the chute is the turnover member shown in Fig. 5 which device is operated from the cam 91 carried by the shaft 67 of the press (Fig. 8), such cam also operating the ejector of the press as hereinafter described. The turnover member comprises a pair of arms 38 and 39 mounted on the shaft 40 and working in the chute O. The parts are shown in stop position at which time one of the blanks D lies upon the arm 39 with its lower edge in engagement with the arm 38. To turn the blank over and allow it to pass down the chute, the shaft 40 is rotated so that the arm 38 fits into the recess 41 in the bottom of the chute at which time the blank is free to continue on through the chute and drop into the mold recess M lying directly beneath the opening 42 (Fig. 7) at the bottom of the chute. The shaft 40 carries at its outer end the spur gear 43 which is engaged by an internal gear 44 mounted in a suitable casing and adapted to be rotated by the arm 45 which is bolted to the gear plate. The arm 45 is moved up by the cam 91 (Fig. 8) whose upper surface engages the roller 46 on the lever 47$^a$ (Fig. 8) at the lower end of the connecting rod 47, which rod is guided vertically by suitable means not shown. The arm is moved in the other direction by the spring 48. The foregoing is only one of a number of arrangements which might be employed for turning the blanks over in their movement from the furnace to the press. This feature of operation is desirable, as it results in giving a pressed blank which is comparatively free from defects on one side, all of the defects incident to heating and pressing being upon the other side. These defects consist principally of the impress of the hearth or carrier on the side of the blank which engages the hearth and of the fin which is formed in the pressing operation incident to an excess of glass in the blank which is being pressed, such fin being formed on the side next to the plunger. The turning over of the blanks, therefore, brings the upper or unmarred face of the blank so that it faces down in the mold and is free from any marring effect produced by the pressing.

In order to maintain the upper surface of the hearth smooth and level, the grinding wheel H is preferably employed, such wheel being mounted and driven as indicated in Figs. 1 and 3. The grinder is mounted upon a shaft 49 supported in the bracket 50, such shaft being adjustable vertically by means of the lever 51 fulcrumed upon the bracket at 52 and having its inner forked end in engagement with the grooved wheel 53 keyed to the shaft. The outer end of the lever is adjusted by means of the screw rod 54 threaded through the end of the lever and swiveled at its end in the brackets 55. The shaft 49 is provided at its upper end with a belt pulley 56 by means of which the shaft is rotated from the motor I by means of the belt 57.

The pressing or molding machine, ordinarily referred to as the press, is driven from the shaft Q through the clutch S. The clutch is made in two parts 58 and 59 with a cam drive portion 60 between them, the shaft Q being divided at this point and the part 58 keyed to the left hand portion of the shaft, while the part 59 is splined to the right hand portion of the shaft. The member 59 is normally held in contact with the member 58 by means of the weighted lever 60$^a$, but when the resistance to the drive becomes too great, the member 59 is forced to the right carrying the lever to the position illustrated at which time it engages a stop 61 as illustrated in Fig. 3, and the clutch members are separated. The right hand end of the shaft Q is provided with a bevel gear 62 engaging and driving another bevel gear 63 on the short vertical shaft 64. The vertical drive shaft 67 of the press is driven by a sprocket chain 68 passing around a sprocket 69 (Fig. 3) on the shaft 64 and a sprocket 70 on the shaft 67 (Fig. 8).

The press comprises a framework J carrying the main drive shaft 67 and the shaft 71, to which the upper end of the table K is secured. On the upper portion of the framework are mounted the air cylinder N and plunger L with suitable operating connections for securing the desired movement and timing of the parts. The shaft 71 with the table carried thereby is given an intermittent step by step rotation from the continuously rotating shaft 67 by means of the arm 72 keyed to the end of the shaft 67 and provided with the roller 73 and the gear 74 keyed to the lower end of the shaft 71, the gear 74 being moved ahead one tooth space upon each revolution of the shaft 71. In order to index the table in each of its positions of rest, it is provided in its periphery with the holes 75 adapted to receive the plunger 78. This plunger is operated by a lever 79 pivoted at 80 and having its lower end provided with a roller 81 engaging a cam 82 on the shaft 67, the lower end of the lever being moved to the left by the cam and to the right by the spring 83. The plunger L is mounted for vertical movement in the bracket 84, to the upper end of which is pivoted the operating lever 85 connected at one end to the plunger L and at its other end to the piston rod 86 carried by the piston 87 of the air cylinder N.

The piston of the air cylinder N is controlled from the valve 88, which valve has a piston 89 carrying a roller 90 operated from the cam 91 keyed to the shaft 67. This cam as heretofore pointed out, also operates the turnover device of Fig. 5. A pair of pipes 92 and 93 lead from the valve to the upper and lower sides of the piston 87 (Fig. 11), while the pipe 94 serves to conduct the exhaust from the upper side of the piston 87 to a point 95 opposite the chute T (Fig. 1), so that this exhaust is utilized in blowing the blank into the chute after such blanks are ejected from the mold receptacles M. Air is conducted to the valve through the pipe 96, while the pipe 97 conducts away the exhaust from the lower side of the air piston. The parts are so timed and arranged that when a blank is deposited in one of the receptacles M and after moving ahead one step is brought to rest under the plunger, air is admitted through the valve 88 to the lower side of the air piston forcing the piston up and the plunger down, thus pressing the blank in its receptacle. The air valve then moves in the reverse direction to secure an application of air through the pipe 92 to the upper side of the piston and simultaneously opens the exhaust from the pipe 93 to the pipe 97. The plungers 98 working vertically through the table K act as the bottoms of the mold receptacles M, the lower ends of the plungers being supported upon a track 99. This track has its upper surface in a horizontal plane until the portion 100 is reached (Fig. 9) opposite the chute T, at which time the plunger at this point is moved up so that its upper end lies flush with the upper surface of table so that the blank is free to be moved laterally into the chute by an air blast from the exhaust pipe 94. The track 99 is rigidly supported at the point 101 (Fig. 8) where such track lies immediately below the plunger L, so that during the impact of pressing the blank the portion of the table K carrying the mold is securely held against downward movement. In order to keep the mold receptacles of the table heated to proper temperature gas burners 102 (Figs. 8 and 10) are provided at suitable intervals, the flame from such burners being directed downwardly upon the mold cavities of the table.

The operation of the machine, briefly stated is as follows: The operation of the motor causes the rotation of the shaft 14 which drives the main drive shaft Q through the reducing gearing in the casing 15 and the spur gears 16 and 17. The rotation of this shaft Q rotates the cam shaft R through the chain 18 and the drive shaft 9 of the furnace hearth or carrier through the chain 11. The spur gear 7 on the shaft 9 rotates the rack 8 secured to the bottom of the carrier or hearth C so that such hearth is caused to move slowly around in the direction of the arrow as indicated in Fig. 1.

The rotation of the cam shaft R reciprocates the feed device E, such device being operated from the cam 19 on the shaft R through the lever 25 and other connecting parts. As the blanks are placed in front of the plunger 23 of the feed device by hand or from a hopper, they are fed onto the carrier or hearth C at spaced intervals as indicated at Fig. 1. As the blanks are carried from this point around to the discharge device F, they are gradually heated up to a temperature upwards of 1500°, at which temperature they become plastic, so that they may readily be pressed, but are not soft enough to flow or become deformed to any substantial extent.

Arriving at the discharge device F, they are pushed into the chute O by such device, it being operated from the cam 20 through the lever 30, the connecting rod 33 and other connecting parts. The blanks move down the chute until they engage the turnover device 38 and 39 (Fig. 5) and this device is oscillated at suitable intervals from the cam 91 acting through the arms 47ª, 47 and 45 which carries the blanks over to a point above the recess 41 from which point they slide down the chute and drop through the opening 42 at the bottom of the chute into the mold receptacle.

The main drive shaft 67 of the press is operated from the main drive shaft Q of the machine through the bevel gears 62 and 63 (Fig. 3) and the sprocket chain 68 which passes around the sprockets 69 and 70 keyed respectively to the shafts 64 and 67. The rotation of the shaft 67 accomplishes the indexing of the table K by means of the plunger 78 operated from the cam 82 on the shaft 67, such plunger being actuated through the lever 79. The movements of the plunger L in pressing the blank are controlled from the cam 91 on the shaft 67 which cam engages the roller at the lower end of the air valve piston 89, such air valve piston being moved up by the cam and down by the spring 103 to give the necessary control for working the air piston 87 up and down and thus reciprocating the plunger L. After the pressing of a blank, the indexing plunger 78 is withdrawn and the rotation of the shaft 67 brings the roller 73 on the arm 72 (Fig. 8) into one of the notches of the gear wheel 74 at the lower end of the table operating the shaft 71 and the rotation of the shaft 71 by this gear connection is just sufficient to bring another of the mold receptacles M into position beneath the plunger L, at which time the table is again indexed by the plunger 78 and the cycle of operation is repeated. When the mold cavities reach a point opposite the discharge chute T, the lower ends of the plungers 98 which constitute the bottoms of the mold receptacles ride upward on the supporting track 99 so as to eject the blanks from the receptacle and they are blown into the chute by the exhaust from the pipe 94, thus completing the operation.

What I claim is:

1. The combination with a tunnel heating chamber provided with a continuous carrier for optical blanks and a molding or pressing machine adjacent the exit end of the chamber, of automatic transfer means between the carrier and the pressing machine, and reversing means for turning the blanks upside down in their passage to the pressing machine.

2. The combination with a tunnel heating chamber provided with a continuous carrier for optical blanks and a molding or pressing machine adjacent the exit end of the chamber, of automatic transfer means between the carrier and the pressing machine, including turnover means for turning the blanks upside down.

3. In combination, a tunnel furnace comprising a chamber of annular form open at the bottom having a portion thereof cut away, an annular carrier for blanks to be heated fitting into the open bottom of the chamber, means for giving the chamber a progressively increasing temperature, and means for rotating the carrier, a press located at the cut away portion of the furnace, and automatic means for transferring the blanks from the carrier to the press.

4. In combination, a tunnel furnace comprising a chamber of annular form open at the bottom having a portion thereof cut away, an annular carrier for blanks to be heated fitting into the open bottom of the chamber, means for giving the chamber a progressively increasing temperature, and means for rotating the carrier, a press located at the cut away portion of the furnace, and automatic means for transferring the blanks from the carrier to the press, comprising a pusher or plunger mounted for movement transversely of the carrier opposite the press and means for reciprocating said pusher.

5. In combination, a tunnel furnace comprising a chamber of annular form open at the bottom having a portion thereof cut away, an annular carrier for blanks to be heated fitting into the open bottom of the chamber, means for giving the chamber a progressively increasing temperature, and means for rotating the carrier, a press located at the cut away portion of the furnace, and automatic means for transferring the blanks from the carrier to the press, comprising a water cooled pusher or plunger mounted for movement transversely of the carrier opposite the press and means for reciprocating said pusher.

In testimony whereof, I have hereunto subscribed my name this 26th day of January, 1923.

THOS. ROTHERAM.